United States Patent
Liou et al.

(10) Patent No.: US 7,503,538 B2
(45) Date of Patent: Mar. 17, 2009

(54) FLAT PANEL DISPLAY WITH ANGLE ADJUSTER

(75) Inventors: Guan-De Liou, Taipei (TW); Chia-Pine Huang, Keelung (TW); Li-Li Lai, Taipei County (TW); Stephen Tsai, Taipei County (TW)

(73) Assignee: Hannspree, Inc., Taipei (TW)

( * ) Notice: Subject to any disclaimer, the term of this patent is extended or adjusted under 35 U.S.C. 154(b) by 81 days.

(21) Appl. No.: 11/283,889

(22) Filed: Nov. 22, 2005

(65) Prior Publication Data

US 2007/0057140 A1    Mar. 15, 2007

(30) Foreign Application Priority Data

Sep. 15, 2005    (TW) .............................. 94215927 U

(51) Int. Cl.
*A47B 97/04*    (2006.01)

(52) U.S. Cl. ....................... 248/447; 248/923

(58) Field of Classification Search ................ 248/447, 248/456, 455, 460, 462, 454, 923, 346.06, 248/922, 920; 361/681; 348/825
See application file for complete search history.

(56) References Cited

U.S. PATENT DOCUMENTS

| | | | | | |
|---|---|---|---|---|---|
| 4,669,694 | A | * | 6/1987 | Malick | 248/397 |
| 5,085,394 | A | * | 2/1992 | Torii | 248/455 |
| 5,168,426 | A | * | 12/1992 | Hoving et al. | 361/681 |
| 5,619,397 | A | * | 4/1997 | Honda et al. | 361/686 |
| 6,094,341 | A | * | 7/2000 | Lin | 361/681 |
| 6,418,010 | B1 | * | 7/2002 | Sawyer | 361/681 |
| 6,487,068 | B1 | * | 11/2002 | Rahemtulla | 361/681 |
| 6,697,045 | B2 | * | 2/2004 | Min | 345/156 |
| 6,700,775 | B1 | * | 3/2004 | Chuang et al. | 361/680 |
| 7,068,496 | B2 | * | 6/2006 | Wong et al. | 361/681 |
| 7,187,538 | B2 | * | 3/2007 | Homer et al. | 361/681 |

* cited by examiner

*Primary Examiner*—A. Joseph Wujciak, III
(74) *Attorney, Agent, or Firm*—Muncy, Geissler, Olds, & Lowe PLLC

(57) ABSTRACT

A flat panel display with an angle adjuster includes a pedestal and an arm member. One end of the arm member couples to the rear portion of the pedestal and the other end of the arm member couples to around the center of a back portion of the flat panel display with a joint. The pedestal includes a positioning adjuster disposed thereon to tilt the flat panel display for adjusting the angle between the flat panel display and the pedestal.

5 Claims, 5 Drawing Sheets

FLAT PANEL DISPLAY WITH ANGLE ADJUSTER

RELATED APPLICATIONS

The present application is based on, and claims priority from, Taiwan Patent Application Number 94215927, filed Sep. 15, 2005, the disclosure of which is hereby incorporated by reference herein in its entirety.

BACKGROUND OF THE INVENTION

1. Field of Invention

The invention relates to an angle adjuster for a flat panel display and, in particular, to an adjusting device for adjusting the angle of a flat panel display using a simple structure positioning adjuster.

2. Related Art

The conventional flat panel display is usually coupled to a pedestal using an angle adjuster with one to several pivotal joints, so that the screen can be adjusted to an angle best for viewing. However, to support weight of the flat panel display and to maintain the desired angle, the pivotal joints are often complicated in structure and more expensive. Most pivotal joints have limits in the supported weight. Therefore, they are only suitable for smaller (below 17 inches) flat panel displays. Moreover, the adjusting and fixing methods of these pivotal joints make use of elastic objects or tightening members, thereby fixing the structure by friction. Frequent use of pivotal joints, the structure is likely to be worn out, rendering instability in the angle adjuster.

SUMMARY OF THE INVENTION

Therefore, an objective of the invention is to provide an angle adjuster for a flat panel display that simplifies the angle adjuster with pivotal joint, saving the production cost.

Another objective of the invention is to provide an angle adjuster for a flat panel display to solve the problem of overloaded weight in conventional pivotal structures. It can thus be applied to larger size flat panel displays (above 23 inches) and flat panel televisions.

To achieve the above objectives, the disclosed angle adjuster for a flat panel display includes a pedestal and an arm member. One end of the arm member couples to a rear portion of the pedestal with a pedestal shaft. The other end couples to the center of a back portion of the flat panel display with a display shaft. The pedestal includes a positioning adjuster coupled to a bottom portion of the flat panel display to alter its position for adjusting the angle between the flat panel display and the pedestal.

The positioning adjuster includes a multi-step adjuster. The multi-step adjuster has several slots disposed in the forward or backward direction on the pedestal. The bottom of the flat panel display can couple to either one of the slots, thereby adjusting the angle between the flat panel display and the pedestal.

The positioning adjuster may include a stepless adjuster. The stepless adjuster has an adjusting portion coupled to the bottom of the flat panel display. The adjusting portion can move forward and backward and stop at any arbitrary position within the range, thereby adjusting the angle between the flat panel display and the pedestal. The stepless adjuster includes a manual transmission mechanism for manually controlling the transmission mechanism to bring the adjusting portion back and forth. Alternatively, the stepless adjuster includes an automatic transmission mechanism driven by a motor to move the adjusting portion back and forth.

Besides, the disclosed angle adjuster for a flat panel display includes at least a pedestal and an arm member. One end of the arm member couples to the rear portion of the pedestal. The other end of the arm member couples to the center of a back portion of the flat panel display with a ball joint in a freely rotatable way. The pedestal includes a positioning adjuster disposed thereon to adjust a bottom position of the flat panel display for adjusting the angle between the flat panel display and the pedestal.

The positioning adjuster includes a multi-step adjuster with a plurality of slots disposed in the forward or backward direction on the pedestal. The bottom of the flat panel display can couple to either one of the slots to adjust the angle between the flat panel display and the pedestal.

The positioning adjuster may include a stepless adjuster. The stepless adjuster has an adjusting portion coupled to the bottom of the flat panel display. The adjusting portion can move forward and backward and stop at any arbitrary position within the range, thereby adjusting the angle between the flat panel display and the pedestal. The stepless adjuster includes a manual transmission mechanism for manually controlling the transmission mechanism to bring the adjusting portion back and forth. Moreover, the stepless adjuster includes a rotating shaft protruding from the adjusting portion and coupled to the bottom of the flat panel display. The flat panel display moves along the axis between the ball joint and the rotating shaft. The rotating shaft may be driven by a motor.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and wherein.

DETAILED DESCRIPTION OF THE INVENTION

The forward direction referred herein is the direction from the flat panel display screen to the user, and the backward direction is the opposite direction. The coupling method mentioned herein refers to any kind of fixed or movable junction method, including fixing, pivotal connection, clicking, screw fastening, embedding, and so on, selected according to the actual situation.

Figure 1:
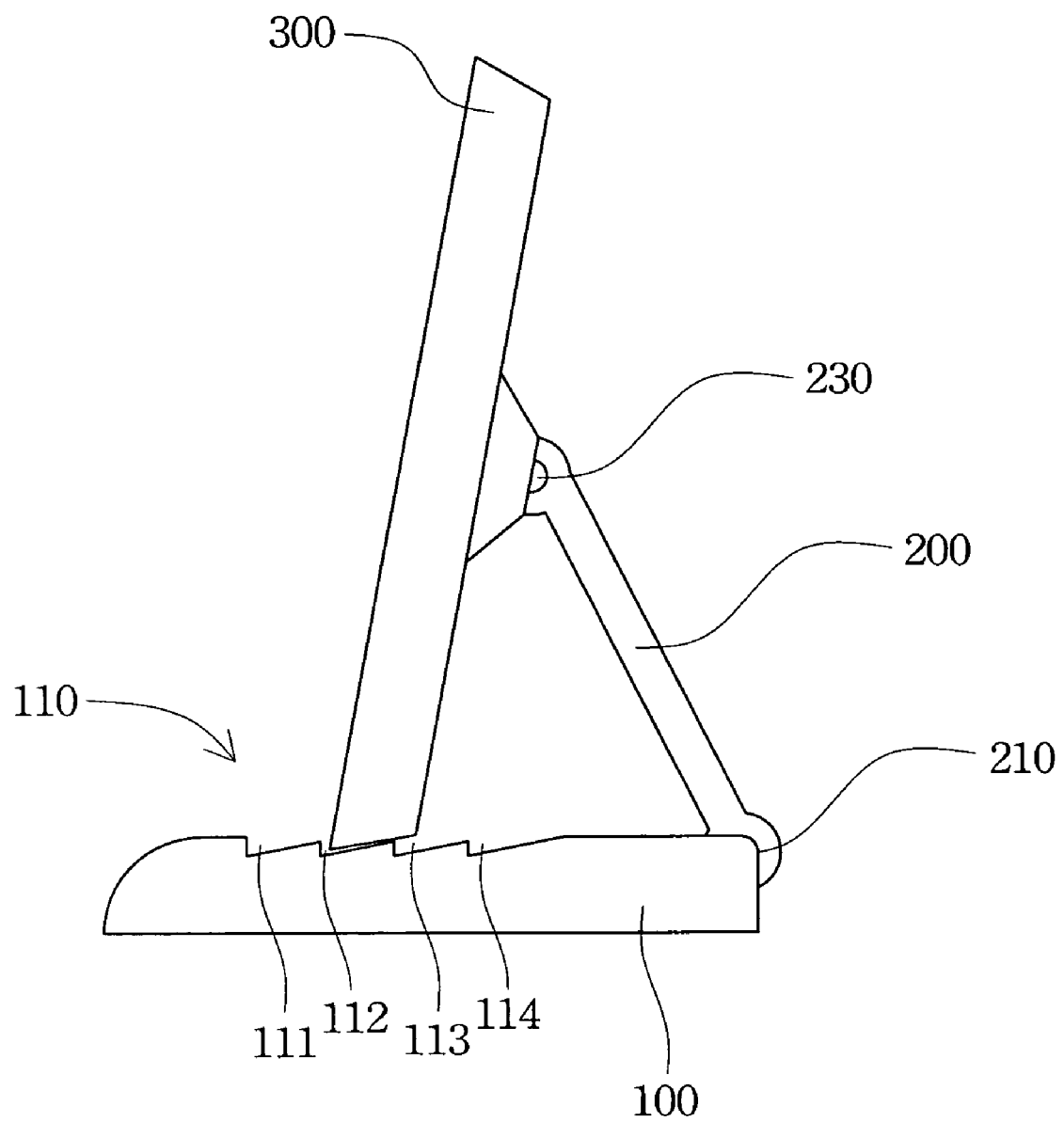
FIG. 1 is a side view of the angle adjuster for a flat panel display according to an embodiment of the invention.

As shown in FIG. 1, the angle adjuster for a flat panel display 300 includes a pedestal 100 and an arm member 200.

One end (first end) of the arm member 200 couples to a rear portion of the pedestal 100 via a pedestal shaft 210. The other end (second end) of the arm member 200 couples to a back portion, preferably around the center, of the flat panel display 300 via a display shaft 230. The pedestal shaft 210 and the display shaft 230 extend roughly in the parallel direction. The arm member 200 rotates about the pedestal shaft 210 with respect to the pedestal 100. The flat panel display 300 rotates about the display shaft 230 with respect to the arm member 200.

The pedestal 100 includes a positioning adjuster. In this embodiment, the positioning adjuster is a multi-step adjuster 110 disposed on the pedestal 100 in front of the pedestal shaft 210. The multi-step adjuster 110 includes several slots 111, 112, 113, 114 disposed in the forward or backward direction on the pedestal 100. The bottom surface of the flat panel display 300 can couple to either one of the slots. When the bottom of the flat panel display 300 couples to a slot farther away from the pedestal shaft 210 (i.e., the slot 111 in the drawing), the angle between the flat panel display 300 and the pedestal 100 is larger. On the other hand, when the bottom of the flat panel display 300 couples to a slot closer to the pedestal shaft 210 (i.e. the slot 114 in the drawing), the angle between the flat panel display 300 and the pedestal 100 is smaller. Therefore, one can adjust the angle between the flat panel display 300 and the pedestal 100 (the placing plane).

Figure 2:
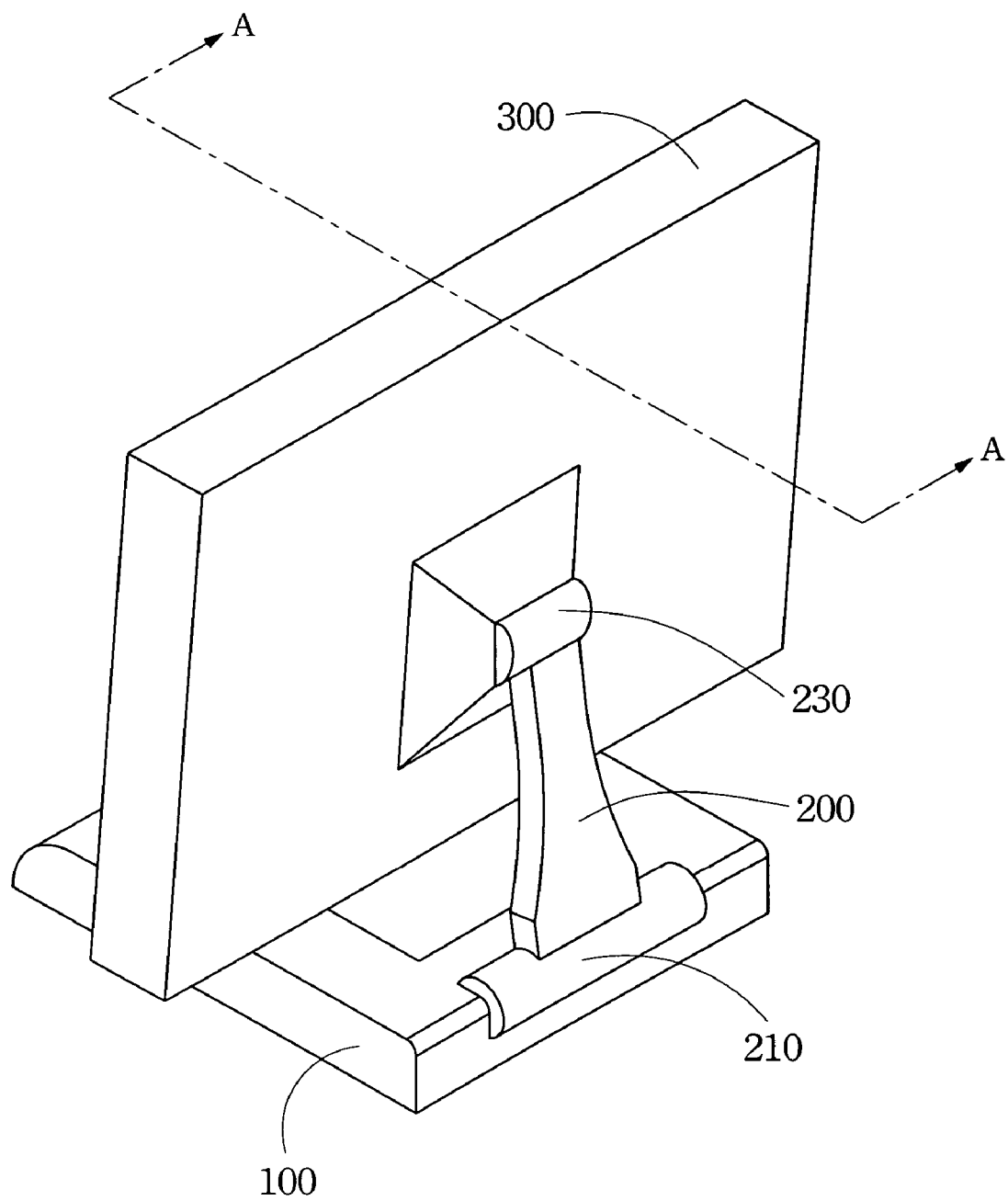
FIG. 2 is a rear view of the angle adjuster for a flat panel display in one application.
Figure 3:
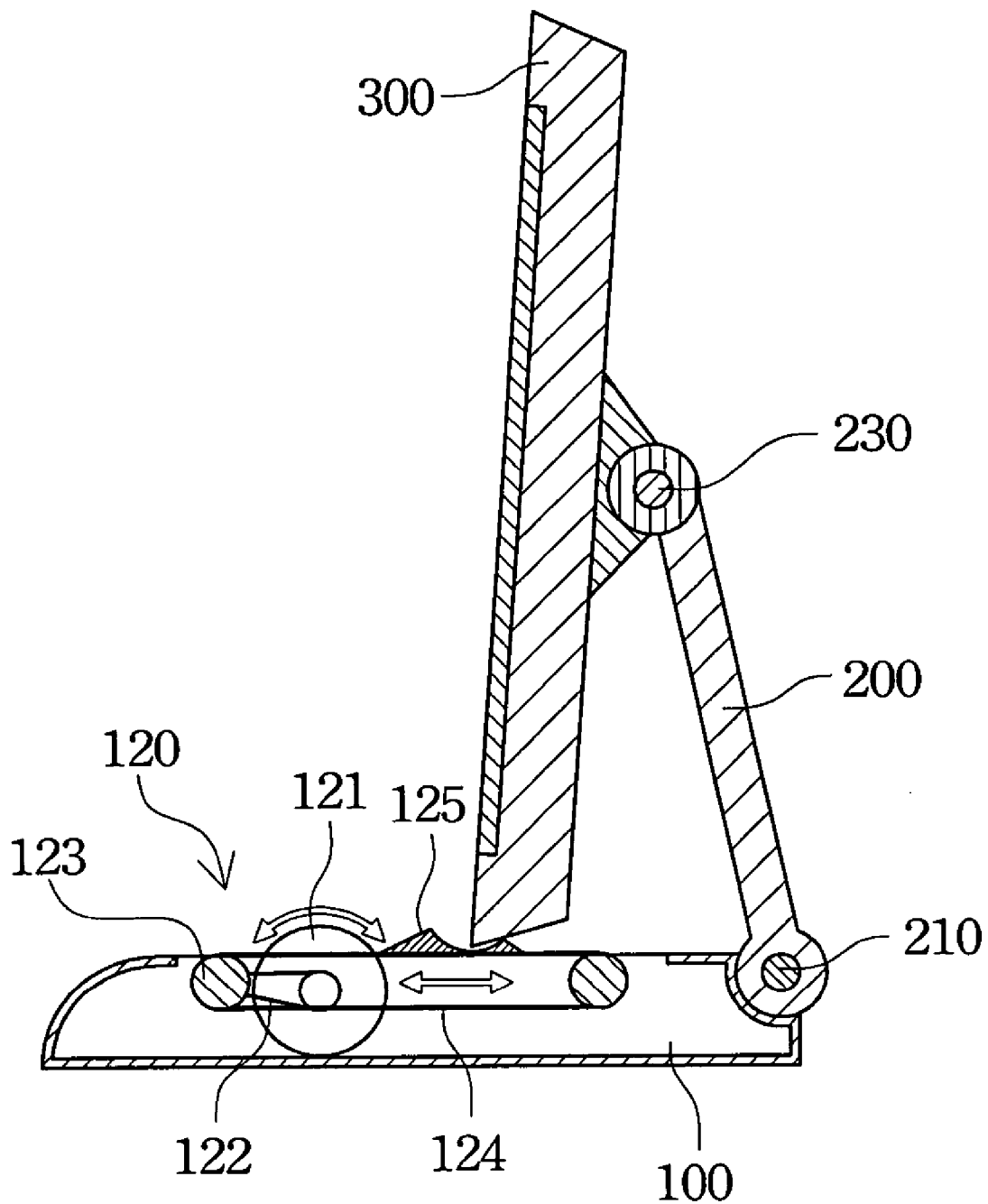
FIG. 3 is a cross-sectional view along the A-A line in FIG. 2.

FIGS. 2 and 3 show applications of the angle adjuster for a flat panel display. The same elements as in FIG. 1 are labeled using the same numerals, and their descriptions are omitted here. As shown in FIG. 3, the angle adjuster for a flat panel display includes a positioning adjuster. In this embodiment, the positioning adjuster is a stepless adjuster 120 disposed on the pedestal 100 in front of the pedestal shaft 210. The difference between the current embodiment and the embodiment in FIG. 1 is in that the stepless adjuster 120 can freely move the bottom of the flat panel display 300 back and forth and stops it at any arbitrary position within the range.

As shown in FIG. 3, the stepless adjuster 120 includes an active roller 121, a first transmission belt 122, a passive roller 123, a second transmission belt 124, and an adjusting portion 125. The active roller 121 protrudes from the top of the pedestal 100 and drives the passive roller 123 using the first transmission belt 122. The passive roller 123 drives the second transmission belt 124 to move the adjusting portion 125 back and forth. The motion of the active roller 121 is transmitted by the first transmission belt 122, the passive roller 123, and the second transmission belt 124 to the adjusting portion 125, thereby adjusting the moving speed of the adjusting portion 125 and the force needed to move the adjusting portion 125. The bottom of the flat panel display 300 couples to the adjusting portion 125. As the adjusting portion 125 moves away from the pedestal shaft 210, the angle between the flat panel display 300 and the pedestal 100 becomes larger. On the other hand, as the adjusting portion 125 moves toward the pedestal shaft 210, the angle between the flat panel display 300 and the pedestal 100 becomes smaller.

Figure 4:
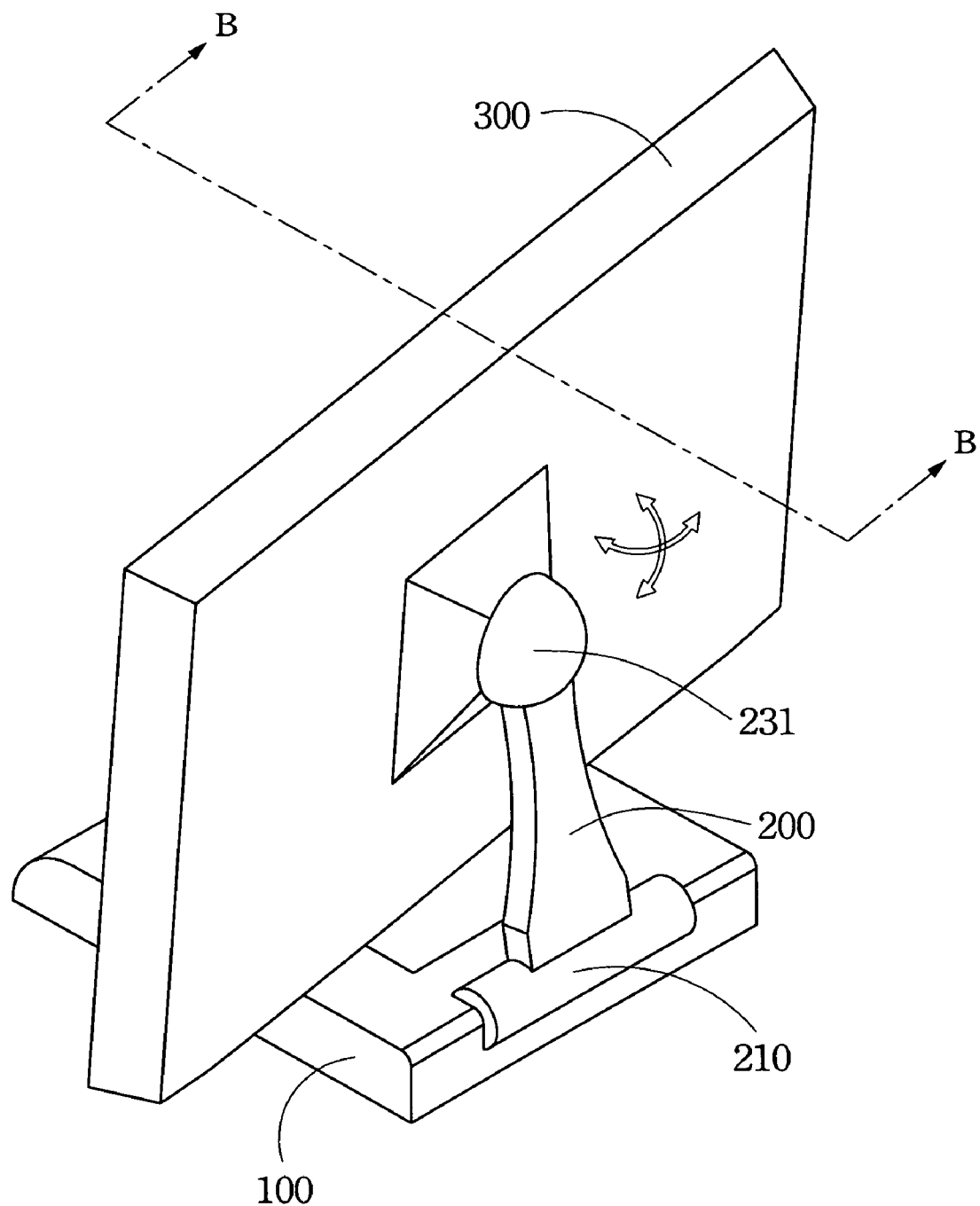
FIG. 4 is a rear view of the angle adjuster for a flat panel display in another application.
Figure 5:
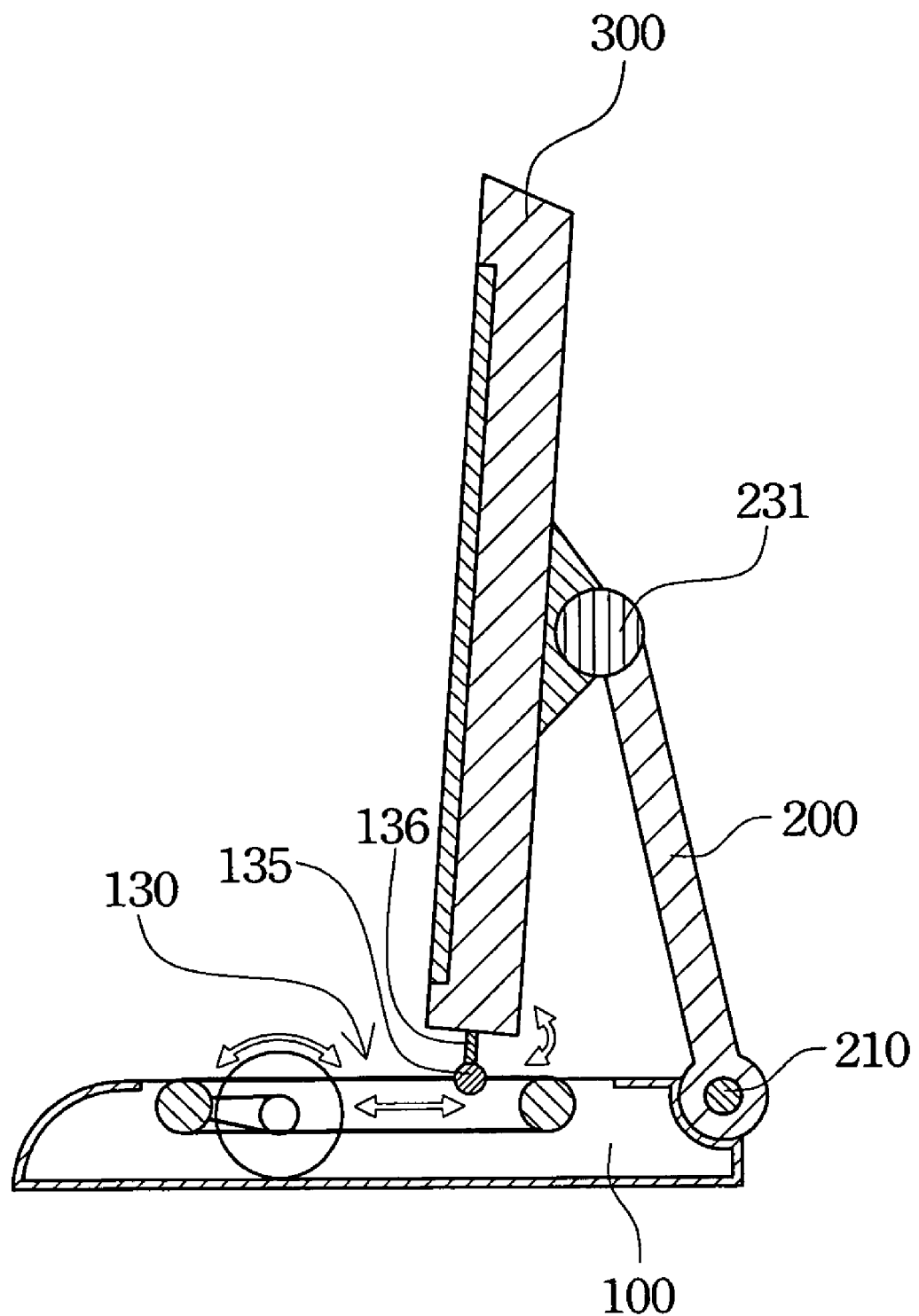
FIG. 5 is a cross-sectional view along the B-B line in FIG. 4.

FIGS. 4 and 5 show another embodiment of the angle adjuster for a flat panel display. The elements same as in FIGS. 1, 2, and 3 are labeled using the same numerals, and their descriptions are omitted here. As shown in FIG. 4, the angle adjuster for a flat panel display includes a pedestal 100 and an arm member 200. The arm member 200 couples via a ball joint 231 in a rotatable way to a back portion, preferably around the center, of the flat panel display 300. The flat panel display 300 rotates about the ball joint 231 with respect to the arm member 200.

As shown in FIG. 5, the pedestal 100 includes a rotating adjuster 130 the same as the stepless adjuster 120. The adjusting portion 135 can move back and forth to adjust the angle between the flat panel display 300 and the pedestal 100. The rotating adjuster 130 further includes a rotating shaft 136 protruding from the adjusting portion 135 and coupling to the bottom, preferably around the center, of the flat panel display 300. Since the bottom of the flat panel display 300 is supported merely by the rotating shaft 136, the flat panel display 300 can move sideways along the axis of the ball joint 231 and the rotating shaft 136. With the forward or backward motion of the adjusting portion 135 mentioned above, the user can adjust the screen toward an arbitrary direction for viewing.

Various modifications can be made within the spirit of the invention. For example, the area, size, shape, weight of the pedestal 100 is not restricted by the invention. The length of the arm member 200 and the actual coupling position between the arm member 200 and the flat panel display 300 are not specified. Flat panel displays 300 of all sizes and weights can be considered. It is, however, preferably to select the flat panel display 300 that can be stably supported. FIG. 1 uses a multi-step adjuster 110 with four slots. However, the number of slots is not restricted. The stepless adjuster 120 in FIG. 3 manually pushes the active roller 121 to move the adjusting portion 125 via transmission mechanisms such as the transmission belts. However, one may use other transmission mechanisms such as gears and chains to drive the adjusting portion 125. Alternatively, the position of the adjusting portion 125 can be manually adjusted. It stops on the pedestal 100 by the friction between the adjusting portion 125 and the pedestal 100. Besides, an automatic transmission mechanism such as the electric motor can be used to drive the adjusting portion 125. The rotating direction of the motor is controlled to move the adjusting portion 125 back and forth. The rotating direction of the motor is controlled directly by an operating button on the pedestal 100 or in a wireless way. Likewise, the adjusting portion 135 of the rotating adjuster 130 can be controlled in the same manner as above. The rotating shaft 136 can be driven by an electric motor, so that the rotating shaft 136 can be controlled to rotate clockwise or counterclockwise by controlling the rotating direction of the motor. The screen of the flat panel display 300 is thus moved sideways. The rotating direction of the motor can be controlled by an operating button on the pedestal or in a wireless way. Although not shown in the drawings, the display shaft 230 in FIGS. 1 and 2 can be replaced by a ball joint 231 to simplify the management of component stocking. Such variations should be included in the scope of the invention.

According to the above-mentioned embodiments, the invention has the following advantages:

1. The angle adjuster for a flat panel display according to the invention simplifies the conventional angle adjuster with pivotal joints and saves the production cost.

2. The disclosed angle adjuster for a flat panel display uses the positioning adjuster on the pedestal to adjust the angle between the flat panel display and the pedestal by tilting the flat panel display. This method can effectively solve the problem of overloaded weight in the conventional pivotal structures. Therefore, the invention is suitable for flat panel displays with larger sizes (e.g. above 23 inches).

3. The disclosed angle adjuster for a flat panel display does not include any elastic object or tightening structure. There is less wearing at the joints due to friction. Therefore, the invention can stably adjust the angle and support the flat panel display.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An angle adjuster for a flat panel display, comprising:

a pedestal; and an arm member, having a first end coupled to a rear portion of the pedestal via a pedestal shaft and a second end coupled to a back portion of a flat panel display via a display shaft;

wherein the pedestal includes a positioning adjuster coupled to a bottom portion of the flat panel display to tilt the flat panel display thus adjusting the angle between the flat panel display and the pedestal;

wherein the positioning adjuster includes a stepless adjuster having an automatic transmission mechanism to move an adjusting portion that is coupled to the bottom of the flat panel display, forward or backward by using an electric motor, and stops at any arbitrary position within its range, thereby adjusting the angle between the flat panel display and the pedestal.

2. An angle adjuster for a flat panel display, comprising:

a pedestal; and an arm member having a first end coupled to a rear portion of the pedestal via a pedestal shaft and a second end coupled to a back portion of a flat panel display via a ball joint in a rotatable way;

wherein the pedestal includes a positioning adjuster coupled to a bottom portion of the flat panel display to tilt the flat panel display thus adjusting the angle between the flat panel display and the pedestal;

wherein the positioning adjuster includes a stepless adjuster having a manual transmission mechanism to move an adjusting portion that is coupled to the bottom of the flat panel display, forward or backward by manually operating the transmission mechanism, and stops at any arbitrary position within its range, thereby adjusting the angle between the flat panel display and the pedestal.

3. An angle adjuster for a flat panel display, comprising:

a pedestal; and an arm member having a first end coupled to a rear portion of the pedestal via a pedestal shaft and a second end coupled to a back portion of a flat panel display via a ball joint in a rotatable way;

wherein the pedestal includes a positioning adjuster coupled to a bottom portion of the flat panel display to tilt the flat panel display thus adjusting the angle between the flat panel display and the pedestal;

wherein the positioning adjuster includes a stepless adjuster having an automatic transmission mechanism to move an adjusting portion that is coupled to the bottom of the flat panel display, forward or backward by using an electric motor, and stops at any arbitrary position within its range, thereby adjusting the angle between the flat panel display and the pedestal.

4. An angle adjuster for a flat panel display, comprising:

a pedestal; and an arm member having a first end coupled to a rear portion of the pedestal via a pedestal shaft and a second end coupled to a back portion of a flat panel display via a ball joint in a rotatable way;

wherein the pedestal includes a positioning adjuster coupled to a bottom portion of the flat panel display to tilt the flat panel display thus adjusting the angle between the flat panel display and the pedestal;

wherein the positioning adjuster includes a stepless adjuster with an adjusting portion that is coupled to the bottom of the flat panel display, forward or backward, and stops at any arbitrary position within its range, thereby adjusting the angle between the flat panel display and the pedestal;

wherein the stepless adjuster includes a rotating shaft protruding from the adjusting portion and coupling to the bottom portion of the flat panel display so that the flat panel display rotates along the axis between the ball joint and the rotating shaft.

5. The angle adjuster for a flat panel display of claim 4, wherein the rotating shaft is driven by a motor.

* * * * *